US011084968B2

(12) United States Patent
Akaighe et al.

(10) Patent No.: US 11,084,968 B2
(45) Date of Patent: *Aug. 10, 2021

(54) COMPOSITIONS AND METHODS FOR TREATING OIL AND GAS WELLS

(71) Applicant: Sasol Performance Chemicals GmbH, Hamburg (DE)

(72) Inventors: Nelson Akaighe, Lake Charles, LA (US); Jorge Fernandez, Lake Charles, LA (US); Christian Jones, Sulphur, LA (US)

(73) Assignee: Sasol Chemicals GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,650

(22) Filed: Apr. 12, 2019

(65) Prior Publication Data
US 2019/0233710 A1  Aug. 1, 2019

Related U.S. Application Data

(63) Continuation of application No. 15/325,845, filed as application No. PCT/US2015/040362 on Jul. 14, 2015, now Pat. No. 10,259,986.

(60) Provisional application No. 62/024,888, filed on Jul. 15, 2014.

(51) Int. Cl.
C09K 8/52 (2006.01)
C09K 8/40 (2006.01)
C09K 8/524 (2006.01)
C09K 8/74 (2006.01)

(52) U.S. Cl.
CPC .......... C09K 8/52 (2013.01); C09K 8/40 (2013.01); C09K 8/524 (2013.01); C09K 8/74 (2013.01); C10M 2207/0406 (2013.01)

(58) Field of Classification Search
CPC . C09K 8/52; C09K 8/40; C09K 8/524; C09K 8/74; C10M 2207/0406
See application file for complete search history.

(56) References Cited

U.S. PATENT DOCUMENTS

| 6,010,989 | A  | * | 1/2000  | Krull ...................... C10L 1/143 508/475 |
| 7,629,299 | B2 |   | 12/2009 | Berger et al. |
| 7,846,421 | B2 | * | 12/2010 | Braeutigam ............ A61K 8/33 424/43 |
| 10,259,986 | B2 | * | 4/2019  | Akaighe .................. C09K 8/40 |
| 2007/0265171 | A1 |   | 11/2007 | Javora et al. |
| 2008/0261836 | A1 |   | 10/2008 | Filler et al. |

(Continued)

FOREIGN PATENT DOCUMENTS

| CN | 101717626 | 6/2010 |
| EP | 0900836 | 3/1995 |

(Continued)

Primary Examiner — James C Goloboy
(74) Attorney, Agent, or Firm — Bushman Werner, P.C.

(57) ABSTRACT

A composition for use in various down-hole operations in oil and gas wells. The compositions can include various combinations of certain ethers and other components e.g., esters, alkoxylated alcohols, acidizing agents and hydrocarbon co-solvents. The compositions are useful in a wide variety of down-hole applications particularly well cleaning, filter cake removal and well stimulation techniques e.g., acidizing.

9 Claims, 1 Drawing Sheet

Blank | Dihexyl ether only | 500 ppm TDA-7 in dihexylether | D-limonene only | 500 ppm TDA-7 in D-limonene

(56) References Cited

U.S. PATENT DOCUMENTS

| | | | |
|---|---|---|---|
| 2009/0286701 A1 | 11/2009 | Davidson | |
| 2010/0022417 A1* | 1/2010 | Acunto | C09K 8/524 |
| | | | 507/90 |
| 2014/0284057 A1* | 9/2014 | Champagne | C09K 8/602 |
| | | | 166/305.1 |

FOREIGN PATENT DOCUMENTS

| | | |
|---|---|---|
| RU | 2065947 | 8/1996 |
| RU | 2011124806 | 12/2012 |
| WO | 2010/044818 | 4/2010 |
| WO | 2014070692 | 5/2014 |

* cited by examiner

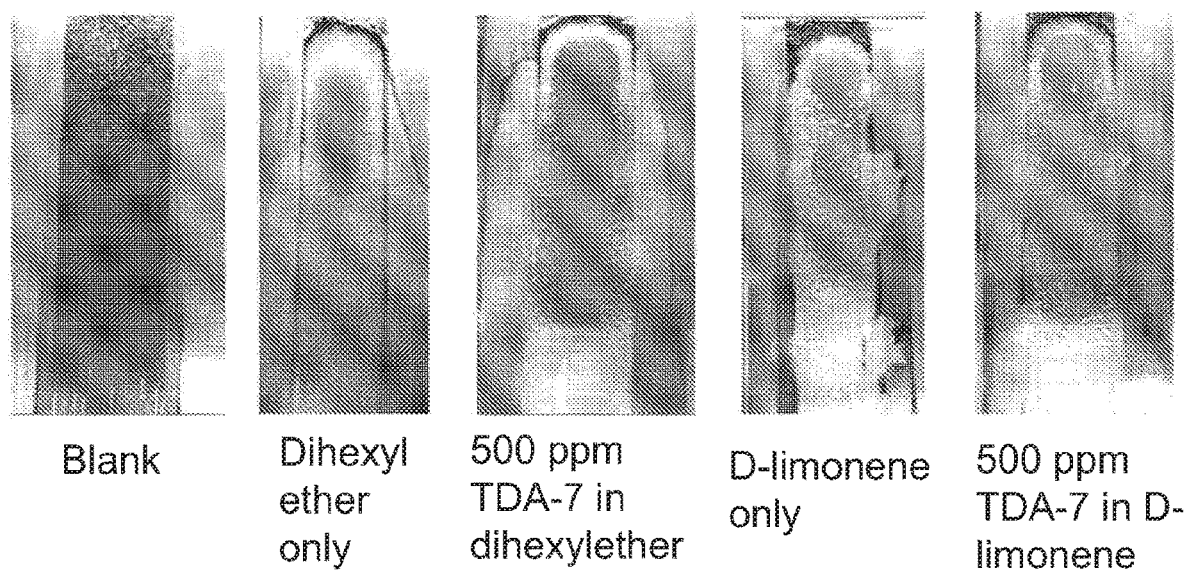

COMPOSITIONS AND METHODS FOR TREATING OIL AND GAS WELLS

CROSS REFERENCE TO RELATED APPLICATION

This application is a continuation of U.S. application Ser. No. 15/325,845, filed Jan. 12, 2017, which is a national phase of PCT/US205/040362, filed Jul. 14, 2015, which in turn claims priority to U.S. application Ser. No. 62/024,888 filed on Jul. 15, 2014, the disclosures of which are incorporated herein by reference for all purposes.

FIELD OF THE INVENTION

The present invention relates to compositions and methods for the treatment of oil and/or gas wells. More particularly, the invention relates to compositions and methods for removing unwanted wellbore wall residue and water wetting the wellbore surface. Most particularly, the invention relates to the use of solvent blends and surfactant/cosurfactant combinations for wellbore cleaning, spacer and displacement fluids, as well as breaker fluid for filter cake removal.

BACKGROUND OF THE INVENTION

There are a number of operations performed in connection with the drilling, completion, stimulation and production of oil and/or gas from earth bore holes. In nearly all of these operations various liquid/fluid compositions are employed to achieve desired results depending upon the operation being conducted. For instance, solvents are employed as base oils in drilling fluid formulations, in completion fluids such as in wellbore cleaning prior to cementing, in stimulation fluids such as in hydraulic fracturing or acidizing formulations, and in production operations such as in dissolution of paraffin solids in heavy crude oils and co-solvents for emulsion breakers.

By way of example only, currently wellbore cleaning operations may be conducted using solvents such as toluene and xylene often called thinning/cleaning spacers, and used as single fluid spacers or microemulsions. Xylene and toluene pose environmental concerns because of their toxicity and carcinogenic nature. As an alternative in wellbore cleaning applications, terpenes can be employed. However terpenes such as d-limonene suffer from disadvantages of unstable pricing and low flash point.

Given safe handling, stable supply and cost concerns, there is a never ending search for well treating fluids that are non-toxic, biodegradable, and cost effective for use in virtually all operations involving the construction of an oil and or gas well.

SUMMARY OF THE INVENTION

In one aspect, the present invention provides environmentally safe compositions for use in various wellbore cleaning operations.

In another aspect, the present invention provides solvents/compositions which possess high flash points and good solvency properties for use in various wellbore cleaning operations.

In yet another aspect, the present invention provides surfactants and solvents/compositions which possess high flash points and good solvency properties for use in various wellbore cleaning operations.

In yet another additional aspect, the present invention provides methods of treating wellbores such as wellbore cleaning and/or filter cake removal prior to cementing operations to provide good bonding between the steel casing and formation.

These and further features and advantages of the present invention will become apparent from the following detailed description, wherein reference is made to the figures in the accompanying drawings.

BRIEF DESCRIPTION OF THE DRAWINGS

FIG. 1 is a series of photographs comparing various compositions in their ability to remove oily residue from a stainless steel surface.

DETAILED DESCRIPTION OF PREFERRED EMBODIMENTS

The compositions of the present invention are characterized by the inclusion of an ether, as described more fully below.

As is known by those skilled in the art, liquids having a high flash point are desirable for any solvent/composition employed for almost any kind of treatment of an oil/gas well. This invention describes a novel method or process that involves the use of ethers alone, ethers/wetting surfactants, ethers/esters, ethers/surfactants/esters, and optionally a co-solvent to remove unwanted residues from a wellbore surface. Any previous mention or application of ethers and esters have been limited to their use in oil based drilling fluid formulations to improve lubricity, environmental and temperature profiles as well as increase electrical conductivity of the drilling fluids. Accordingly, the compositions of the present invention employ ethers containing from about 8 to about 30 carbon atoms and having the general formula:

$$R-O-R_1 \qquad \text{I}$$

wherein R and $R_1$ are each alkyl groups, independent of each other, that can be linear or branched, and containing from about 1 to about 29 carbon atoms. In a preferred embodiment, the alkyl groups R and $R_1$ each contain from 5 to 7 carbon atoms.

Non-limiting examples of suitable ethers include di-butylether, dihexyl ether, diheptyl ether, dioctyl ether, dinonyl ether, didecyl ether, hexyl-octyl ether, hexyl-heptyl ether, di(2-ethyl hexyl) ether, di(2-propyl heptyl) ether etc. Thus, the ether can be symmetrical or asymmetrical and can comprise a mixture of the various ethers, e.g. a symmetrical ether and an asymmetrical ether.

The other basic component of the compositions of the present invention is a mixture of one or more of the ethers described above with an ester or surfactant which can be (1) ester with one or more than one ester group, (2) an alkoxylated alcohol, or (3) mixtures thereof.

The basic esters useful in the compositions of the present invention may have the general formulas:

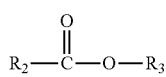

II

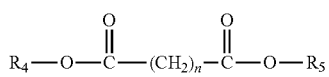

III where $R_2$ to $R_5$ are linear or branched alkyl groups each having from 1 to 30 carbon atoms, and n is from 0 to 20.

Non-limiting examples of typical carboxylic acids that can be employed in making the monobasic esters include formic acid, acetic acid, valeric acid, caprylic acid, lauric acid, arachidic acid. Non-limiting examples of typical carboxylic acids that can be employed in making the dibasic esters include oxalic acid, malonic acid, succinic acid, glutaric acid, adipic acid, pimelic acid, phthalic acid, azelaic acid, etc. Non-limiting examples of typical carboxylic acids that can be employed in making the tribasic esters include citric acids, aconitric acid, trimesic acid, propane-1, 2, 3-tricarboxylic acid etc.

The alcohols useful in forming the esters of the present invention comprise monohydroxy alcohols containing from 1 to 30 carbon atoms and can be linear alcohols, branched alcohols, or Guerbet alcohols (generally described as 2-alkyl-1-alcohols). Non-limiting examples of suitable alcohols include methanol, ethanol, propanol, butanol, hexanol, octanol, decanol, 2-butyl-1-octanol, 2-propyl-1-heptanol, 2-ethyl-1-hexanol, etc.

As noted, in addition to the esters described above, the surfactants useful in forming the compositions of the present invention can include a wide variety of alkoxylated alcohols. In general the alkoxylated alcohols useful in the present invention will have the general formula:

$$CH_3(C_xH_{2x})-O-(C_nH_{2n}O)_y-(C_2H_4O)_z-H \quad \text{IV}$$

wherein x is from 3 to 30
n is from 2-4,
y is from 0 to 6, and
z is from 3 to 20.

In particular, preferred alkoxylated alcohols are ethoxylated alcohols wherein
x is from 5 to 29,
y is 0,
z is from 3 to 12.

Non-limiting examples of alcohols that can be employed in making the surfactants are isotridecyl alcohol, isodecyl alcohol, 2-propyl heptanol, 2-ethyl hexanol, lauryl alcohol etc.

In addition to the components listed above, the compositions of the present invention can include co-solvent which is generally hydrocarbon in nature. It is also important to mention that the ethers described earlier can serve as both a solvent and co-solvent at the same time. Typically the co-solvent has a significant content of naphtenic and or highly branched paraffins. As a general rule the co-solvent can contain from about 20% to about 90% or greater napthenics, isoparaffins, or a mixture thereof. In particular, the co-solvent having such a composition will contain hydrocarbons ranging from about $C_8$ to about $C_{30}$. Table 1 below lists non-limiting examples of the wide variety of co-solvents which can be employed in the compositions of the present invention.

TABLE 1

|  | LPA | LPA-142 | LPA-170 | LPA-210 | Diesel | HF-1000 | ODC-15 |
| --- | --- | --- | --- | --- | --- | --- | --- |
| Linear | — | — | — | — | 41.3[1] | 20.9 | — |
| Isoparaffins (mol %) | 25 | 21 | 28 | 30 | — | 14 | 25 |
| Olefins | — | — | — | — | — | 24.89 | — |
| Napthenics (mono-cyclic) (mol %) | 62 | 64 | 60 | 69 | 22.1[2] | 30 | 47 |
| Decalins (bi-cyclic) (mol %) | 13 | 15 | 12 | 1 | 11.9 | — | 10 |
| Aromatics | — | — | — | — | 24.7 | — | 15 |
| Oxygenates | — | — | — | — | — | 3.84[3] | — |
| Carbon chain range | C10-C16 | C-11-C12 | C12-C14 | C14-C16 | C10-C20 | C12-C22 | — |

[1]Depends on specific diesel
[2]Also contains 2.3% tricyclic
[3]Alcohols, esters As can be seen from Table 1, the co-solvent can comprise liquid hydrocarbons having from about 10% to about 35% isoparaffins, from about 30% to about 73% napthenics, and having a carbon chain length of from about C8 to about C30. As can also be seen from Table 1, some of the co-solvents can include significant amounts of linear paraffins while others can contain small amounts of oxygenates such as alcohols, esters or the like. As should also be apparent from Table 1, some of the co-solvents can contain olefins while others e.g. diesel can contain significant amounts of aromatics. In general Table 1 demonstrates that in the compositions of the present invention, the optional co-solvent can employ, with advantage, a wide variety of hydrocarbons albeit that other compounds can be present in certain cases. It will also be understood that although diesel can be employed, it is not preferred as a co-solvent primarily because of its higher aromatics content making it less ecologically desirable.

The ether content of the wellbore cleaning composition of the present invention will generally be present in an amount of from about 40 to about 90 wt % of the total formulation. When a wetting surfactant again is employed, it will comprise from about 0.01 to about 5 wt % of the total composition. When a co-solvent is employed, the co-solvent will comprise from about 10 to about 90 wt % of the total composition.

The compositions of the present invention can be employed to formulate acidizing compositions and the ethers may be present in an amount of about up to 95 wt % of the total composition i.e. the ether, one or more of the surfactants and esters, optionally one of the co-solvents, the acidizing agent including any corrosion inhibitors.

As is well known to those skilled in the art, stimulation is a process used in oil and gas wells to increase or restore production. For example in some cases a well initially drilled exhibits low permeability and stimulation is employed to commence production from the reservoir. Other times, stimulation is used to further encourage permeability and flow from an already existing well that has become under productive. Acidizing is a typical stimulation treatment which is generally performed below the reservoir fracture pressure in an effort to restore the natural permeability of the reservoir rock. As is well known to those skilled in the art, acidizing is achieved by pumping acid into the well to dissolve limestone, dolomite, and calcite cement between the sediment grains of the reservoir rocks. In general there are two types of acidizing, matrix acidizing and fracture acidizing.

Matrix acidizing is performed when acid is pumped into the well and into the pores of the reservoir rocks. In this type of acidization, the acid dissolves the sediment and mud solids that are inhibiting the permeability of the rock, enlarging the natural pores of the reservoir there by stimulating flow of hydrocarbons. While matrix acidizing is generally conducted at a low enough pressure to keep from fracturing the reservoir rock, fracture acidizing involves pumping highly pressurized acid into the well, physically fracturing the reservoir rock and dissolving the permeability inhibitive sediments. In the latter case channels are formed through which the hydrocarbons can flow. While various kinds of acids can be used in an acidizing composition, hydrochloric acid is among the most common but can be combined with hydrofluoric acid so as to have the ability to dissolve quarts, sand and clay from the reservoir rocks. In high temperature application, organic acids such as formic or acetic acids can be used to affect a slower reacting, and thus deeper, stimulation. Thus in the case of the compositions of the present invention, an acidizing composition could comprise ether, one or more of the surfactants, optionally one of the co-solvents and the acid of choice. It will also be recognized that a typical acidizing formulation can contain other components such as inhibitor additives to protect the acid from breaking down the steel casing in the well. Additionally a sequestering agent can be added to block the formation of gels or precipitants of iron, which can clog the reservoir pores during an acidizing job.

Organic solvents used in well stimulation operations such as in acidizing usually have high kauri-butanol (KB) value, which indicates its high dissolving power or solvency for oily residue or organic contaminants. The hexyl ether solvent used in this invention has good solvency and high flash point when compared to d-limonene (see Table 2).

TABLE 2

| Solvent | Flash Point (° F.) | Kauri-Butanol Value |
| --- | --- | --- |
| Toluene | 43 | 102 |
| Xylene | 77 | 98 |
| LPA 142 | 142 | 34 |
| HF1000 | 178 | 18 |
| D-Limonene | 110 | 67 |
| Hexyl Ether | 207 | 95 |

Table 2 clearly shows dihexylether solvent has the same solvency as xylene, but higher solvency and flash point than d-limonene. High flash point solvents are desired in oilfield operations due to lesser risk with solvent handling and potential for fire accidents.

The compositions of the present invention can be used to dissolve/reduce oily residues from wellbore surfaces allowing such surfaces to be water wetted by wetting surfactants. In the drip test method, the Hegman gauge was used to evaluate the ability of ether solvent, ether/surfactant, ether/ester and ether/ester/surfactant compositions to remove or reduce oily residue from the stainless surface. In this method, 1 mL of the solvent and/or surfactant, ester compositions was applied dropwise over 60 seconds time period onto oil smeared evenly on the Hegman stainless steel gauge inclined at an angle of 45 degrees. The surfactant employed was NOVEL® TDA-7 Ethoxylate (TDA-7) manufactured by Sasol North America, Inc. TDA-7 is derived from isotridecyl alcohol ethoxylated to an average of 7 moles of ethylene oxide. FIG. 1 shows digital images of oil left on the Hegman gauge before (Blank) and immediately after solvent and/or solvent/surfactant system runs. In a specific method of using the compositions of the present invention, after a well is drilled with an invert emulsion drilling fluid, it is necessary to remove the oily residue and other organic contaminants from the wellbore surface and water wet the wellbore and casing surface for conducting further operations such as cementing which, as known to those skilled in the art is used to provide good bonding between the casing and the wellbore surface. Similar bonding problem arise when gravel packing is done without significantly reducing or removing the oily residue or cake. The invention comprises of ether composition and wetting surfactant present in an amount that is effective at removing or reducing oily residue in wellbores. The ether by itself will remove or reduce the oily residue but will not water wet the wellbore surface. The inclusion of a wetting surfactant such as TDA-7 will change the formation wettability from oil wet to water wet. The combination of the ether with the surfactant appears to improve the solvency of the wellbore cleaning fluid system as seen in FIG. 1. The addition of 500 ppm of the wetting surfactant (TDA-7) to d-limonene also increased the removal of oily residue from the stainless steel surface due to increased solvency.

During the drilling of a wellbore, various fluids are typically used in the well for a variety of functions. The fluids may be circulated through a drill pipe and drill bit into the wellbore, and subsequently flow upward through the wellbore to the surface. During this circulation the drilling fluid may act to remove drill cuttings, to suspend cuttings and weighting material when circulation is interrupted, to control subsurface pressures, to maintain the integrity of the wellbore until the well section is cased and cemented, to isolate the fluids from the formations by providing sufficient hydrostatic pressure to prevent the ingress of formation fluids into the wellbore, to cool and lubricate the drill string and bit, and/or to maximize penetration rate.

One way of protecting the formation is by forming a filter cake on the surface of the subterranean formation. Filter cakes are formed when particles suspended in the wellbore fluid coat and plug the pores in the subterranean formation such that the filter cake prevents or reduces both the loss of fluids into the formation and the influx of fluids present in the formation. A number of ways of forming filter cakes are known in the art including use of bridging particles, cuttings created by the drilling process, polymeric additives, etc. After completion operations have been accomplished, removal of filter cake performed during drilling and/or completion, remaining on the sidewalls of the wellbore may be necessary. Although filter cake formation and the use of fluid loss pills are essential in drilling and completion operations, the barriers can be a significant impediment to the production of hydrocarbon or other fluids from the well if, for example, the rock formation is still plugged by the barrier. Because the filter cake is compact, it often adheres strongly to the formation wall and may not be readily or completely flushed out of the formation by fluid action alone.

The problems of efficient well cleanup and completion are a significant issue in all wells, and especially in open/hole horizontal well completions. The productivity of a well is somewhat dependent on effectively and efficiently removing the filter cake while minimizing the potential of water blocking, plugging or otherwise damaging the natural flow of the formation, as well as those of the completion assembly.

Accordingly, there is a continuing need for breaker fluid systems that effectively clean the wellbore and do not inhibit the ability of the formation to produce oil or gas once the well is brought into production. The compositions of the present invention are ideally suited breaker fluid and displacement fluid formulations because of this great solvency ability, high flash solvent composition, and the fact they can be formulated to the exact specifications needed for a particular formation.

The compositions of the present invention in general show an excellent ability to remove/reduce oily residues and water wet casing/formation surfaces (FIG. 11). Filter cake cleaning/remover experiment was performed to determine the cleaning efficiency of dihexylether to other solvents. The procedure involves making filter cakes on an API filter press multi-unit device from a non-aqueous drilling mud. The filter cake was pre-weighed, placed in a beaker containing fluid to be tested. A FANN® 35A rheometer was lowered into the fluid, rotated for 10 minutes at 300 RPM test speed and the filter cake removed and reweighed. The data clearly shows that the dihexylether performs much better than xylene in a 12 pound per gallon GTL base diesel drilling fluid. Xylene has always been the easy-to-go organic solvent for removal of oily residues from wellbores of oil wells as seen in Table 3. It has also been found that depending upon the specific choice of ingredients, the compositions of the present invention are effective at removing oily residue formed with different synthetic oil based muds.

TABLE 3

| Solvent | Filtercake Removal (wt %) |
|---|---|
| Dioctylether | 5.9 |
| Xylene | 8.3 |
| HF1000 | 12.8 |
| LPA 142 | 15.5 |
| ODC-15 | 19.2 |
| Dihexylether | 23.3 |
| Dihexylether + surfactant | 24.9 |

Depending on the use to which the compositions of the present invention are to be put, they can be introduced into the wellbore by various methods commonly used in connection with wellbore treating operations. For example in the case of using the composition as a breaker fluid to remove filter cake, the breaker fluid employing the compositions of the present invention can be pumped into the wellbore, the well then being shut in for a desired period of time to break the filter cake, after which the breaker fluid can be removed. In cases where the compositions of the present invention are used for cleaning out the well i.e. removing oily residues etc, the cleaning formulations containing the compositions of the present invention can again be injected into the well and the well shut in for a desired period of time. Alternatively, it is contemplated that the clean out fluid would be circulated in the wellbore/casing until all residues were reduced/removed.

It will be apparent from above that various of the compositions of the present invention can be used in various well treatments including, without limitation, well cleaning, filter cake removal and acidizing. In connection with those well servicing operations, the amount of and particular composition selected will be dictated by the nature of the formation in which the well is drilled, the down-hole conditions e.g., temperatures, etc. Thus, various combinations of the compositions of the present invention with acidizing agents, bio-sides, corrosion inhibitors etc. can be employed and be selected on the basis described above e.g., down-hole conditions. By way of example only, if acidizing is the selected well treatment, it is possible to use just the ethers of the present invention in conjunction with an acidizing agent and optionally a co-solvent. A like situation avails with respect to filter cake removal and other procedures.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A composition for use in down-hole operations in an oil and gas well to effect wellbore cleaning filter cake removal and/or acidizing comprising:

A. an ether having the general formula:

      I wherein R and R₁ are each alkyl groups which, independent of each other, can be linear or branched containing from about 1 to about 29 carbon atoms, the total carbon atoms of said ether being from about 8 to about 30, said ether being present in an amount of 40 to 90 wt %;

B. an alkoxylated alcohol having the general formula:

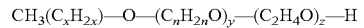      IV wherein x is from 3 to 30, n is from 2 to 4, y is from 0 to 6 and z is from 3 to 20; and C. at least one additional component selected from the group consisting of:

(i) an ester of the formula:

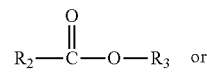      II

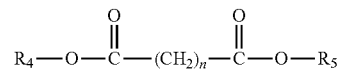      III wherein R₂-R₅ are linear or branched alkyl groups having from 1 to 30 carbon atoms and n is from 0 to 20;

(ii) an acid; and (iii) mixtures of (i) and (ii).

2. The composition of claim 1 further comprising a co-solvent comprising a liquid hydrocarbon containing from about 6 to about 30 carbon atoms.

3. The composition of claim 2 wherein said co-solvent contains from about 20 to about 90 wt % naphthenics, isoparaffins or mixtures thereof.

4. The composition of claim 2 wherein the co-solvent comprises from about 10 to about 35 wt % isoparaffins and, from about 30 to about 73 wt % naphthenics, all of which contain about 8 to about 30 carbon atoms.

5. The composition of claim 1 wherein the combined amount of ester and alkoxylated alcohol being present in an amount of from about 0.01 to about 5 wt %.

6. The composition of claim 2 wherein said co-solvent is present in an amount of from about 10 to about 90 wt %.

7. The composition of claim 1 wherein each R and $R_1$ contain from 5 to 7 carbon atoms.

8. A composition for use in down-hole operations in an oil and gas well to effect wellbore cleaning filter cake removal and/or acidizing comprising:
   A. an ether having the general formula:

$$R\text{—}O\text{—}R_1 \qquad \text{I}$$

wherein R and $R_1$ are each alkyl groups which, independent of each other, can be linear or branched containing from about 1 to about 29 carbon atoms, the total carbon atoms of said ether being from about 8 to about 30, said ether being present in an amount of 40 to 90 wt %; and
   B. an alkoxylated alcohol having the general formula:

$$CH_3(C_xH_{2x})\text{—}O\text{—}(C_nH_{2n}O)_y\text{—}(C_2H_4O)_z\text{—}H \qquad \text{IV}$$

wherein x is from 3 to 30, n is from 2 to 4, y is from 0 to 6 and z is from 3 to 20.

9. A composition for use in down-hole operations in an oil and gas well to effect wellbore cleaning filter cake removal and/or acidizing comprising:
   A. an ether having the general formula:

$$R\text{—}O\text{—}R_1 \qquad \text{I}$$

wherein R and $R_1$ are each alkyl groups which, independent of each other, can be linear or branched containing from 3 to 10 carbon atoms, said ether being present in an amount of 40 to 90 wt %; and
   B. an alkoxylated alcohol having the general formula:

$$CH_3(C_xH_{2x})\text{—}O\text{—}(C_nH_{2n}O)_y\text{—}(C_2H_4O)_z\text{—}H \qquad \text{IV}$$

wherein x is from 3 to 30, n is from 2 to 4, y is from 0 to 6 and z is from 3 to 20.

* * * * *